COMBINED TRANSMISSION LINE TERMINATION AND POWER FEED

Filed March 9, 1959

INVENTORS
Harry R. Foster
Elmo E. Crump
BY
Munn, Liddy, Daniels & March
ATTORNEYS 3,089,057
COMBINED TRANSMISSION LINE TERMINATION AND POWER FEED Harry R. Foster, Montville, and Elmo E. Crump, West Caldwell, N.J., assignors to Ohmega Laboratories, Pine Brook, N.J., a corporation of New Jersey
Filed Mar. 9, 1959, Ser. No. 798,161
14 Claims. (Cl. 315—39)

This invention relates to devices for terminating electrical high-frequency transmission lines while at the same time providing power-feed leads or means to said transmission lines.

The invention is shown in conjunction with a coaxial noise diode, to terminate the coaxial line associated therewith while at the same time providing a source of power for the filament or heater of the diode. With such noise diodes of the coaxial type it is necessary to activate besides the high-frequency circuit a second or additional electrical circuit located axially of the diode, said second circuit being supplied with either D.C. or low-frequency A.C. power for the purpose of energizing the filament or heater of the diode without distrubing the symmetry of the H.-F. circuit or effecting any appreciable mismatch therewith.

Noise diodes now have found widespread use in connection with the making of sensitivity measurements on radio and other electronic equipment. Prior to the use of noise diodes, such measurements were carried out by introducing a continuous wave carrier of known amplitude into the equipment, and comparing the known value of the carrier with the inherent noise of the equipment. Later, as an alternative procedure a diode of conventional construction was used to generate a known or calculable voltage, which was then used as a test signal in place of the C.W. carrier.

More recently, the conventional diode has been replaced by a diode constructed in coaxial form, thus appreciably increasing the frequency range over which readily calculable voltages and signals could be obtained. It was found that such coaxial noise diode, because of its simple and symmetrical geometry, possessed distinct advantages over the prior conventional diode structure which it replaced.

The utilization of such coaxial noise diode, however, presented a difficult problem in properly terminating its coaxial cable or transmission line structure and simultaneously supplying power, either D.C. or low-frequency A.C., for the filament or heater which is associated with the central conductor of the coaxial system.

Assuming that the device or equipment which is to be placed under test is connected to the output side of such a coaxial diode to receive excitation therefrom, and assuming that such equipment is designed for excitation normally by an antenna or other equivalent device having a certain value of impedance, this same impedance value should be present in the noise diode and the associated coaxial line termination, while at the same time the diode may be provided with the proper low-voltage source of power for the filament or heater. In other words, a certain required impedance must be had between the inner and outer conductors of the noise diode, taking into account both the low-voltage source of power and also the transmission line termination provided for the diode.

While a number of solutions have been proposed and utilized in the past to solve the above problem, these solutions have been somewhat complicated as well as large or cumbersome and bulky, thereby restricting the use of such coaxial noise diodes in spite of their superior operating frequency range and otherwise simple construction.

Prior apparatus intended to solve the problem of properly terminating a coaxial noise diode while at the same time supplying it with the necessary filament power has involved expensive equipment which still left much to be desired in terms of accurate impedance control and adjustment, in addition to the disadvantages above stated.

With all such termination apparatus and devices, the end objective which is to be met is the feeding of power for the diode filament through the center conductor of the coaxial transmission line, which center conductor forms one of the terminals of the high-frequency load.

Attempts have been made to constitute the said center conductor of the coaxial line in the form of a twisted pair, by which the filament power may be supplied, and by providing some type of electrical absorption material between the said twisted pair constituting the center conductor and the outer tube or conductor of the coaxial cable (which outer tube is connected to and forms a continuation of the outer tube of the noise diode). The purpose of the material having the property of electrical absorption is to furnish the requisite high-frequency termination for the coaxial line or coaxial diode. Additionally, a low-frequency termination was provided for, in the form of an ordinary low-value non-inductive resistor, connected between one side of the inner twisted pair and the outer cylinder or conductor of the coaxial cable.

Another apparatus or device intended to provide a coaxial termination for noise diodes involved the use of a composite coaxial structure having an annulus or doughnut shape, together with two outwardly radially extended coaxial line sections, the annulus portion being constituted as part of a low-voltage transformer secondary having one or several turns of wire in which a low-frequency voltage is induced for the purpose of providing the heater or filament power for the diode. The composite coaxial structure was arranged to provide a suitable termination for the coaxial line or coaxial noise diode, considering the high-frequency power which is being delivered by the diode.

These and other prior devices intended to solve the problem stated above have invloved an appreciable number of components of more or less complex configuration, requiring appreciable cost in their fabrication and assembly, and have required appreciably space, being in many respects large or bulky and cumbersome. Not only has the problem as above set forth been especially evident in conjunction with the use of coaxial noise diodes, but such problems exist wherever it is desired to introduce power for heating or other purposes to the central conductor of a coaxial system without interfering with the high-frequency characteristics of such system, whatever purpose the system is to be used for.

The above drawbacks and disadvantages of prior devices of the type mentioned are obviated by the present invention, and one object of the invention is to provide a high-frequency termination or attenuation means having a non-high-frequency power feed, which means is responsive to a wide band or range of frequencies while at the same time being extremely simple in its construction and involving relatively few components whereby it is inexpensive to manufacture and produce.

Another object of the invention is to provide a novel and improved combined high-frequency termination or attenuation means and low-voltage power feed as above set forth, which is compact in its construction, relatively small, and of light weight.

A still further object of the invention is to provide an improved transmission line termination means having power feed as above characterized, which is extremely effective and efficient in its operation, providing a desirable relatively low standing wave ratio.

Yet another object of the invention is to provide an improved termination and power feed means of the above type, wherein an effective impedance match is provided with the transmission line which is to be terminated.

An additional object of the invention is to provide an improved termination or attenuation means as above set forth, wherein the filament or power feed means has no adverse influence on the high-frequency characteristics of the transmission line.

A feature of the invention resides in the provision of a novel transmission line termination means having a low frequency or D.C. power feed, wherein a satisfactory impedance match may be had over a wide frequency range covering the frequencies for example between 10 megacycles to 3,000 megacycles.

Further objects of the invention reside in the provision of an improved transmission line termination of the above type, which may be easily constructed of few and inexpensive components, and which may be easily assembled and also easily disassembled for servicing or trouble-shooting.

Other features and advantages will hereinafter appear.

Figure 1:
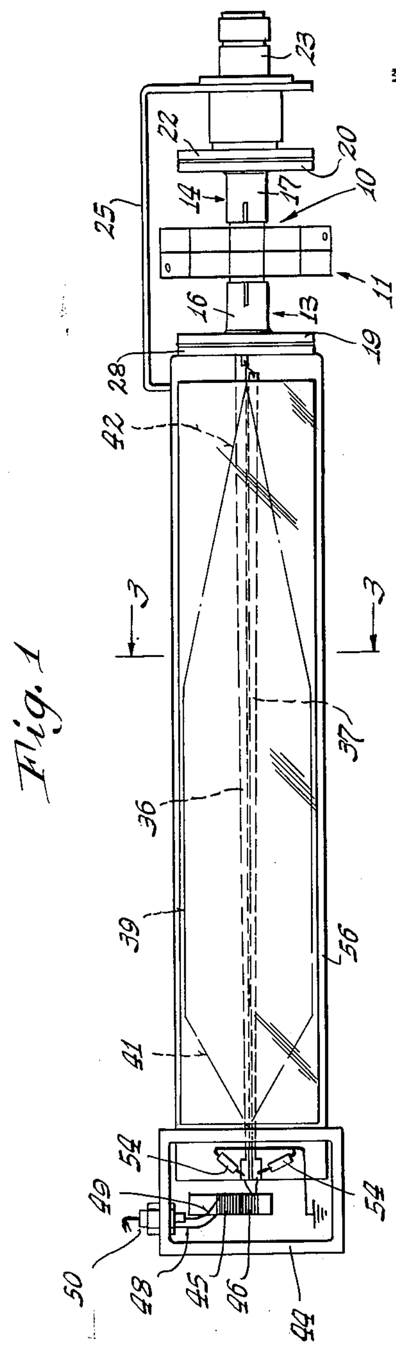
FIGURE 1 is a top plan view of the improved transmission line termination or attenuation means as provided by the invention.
Figure 2:
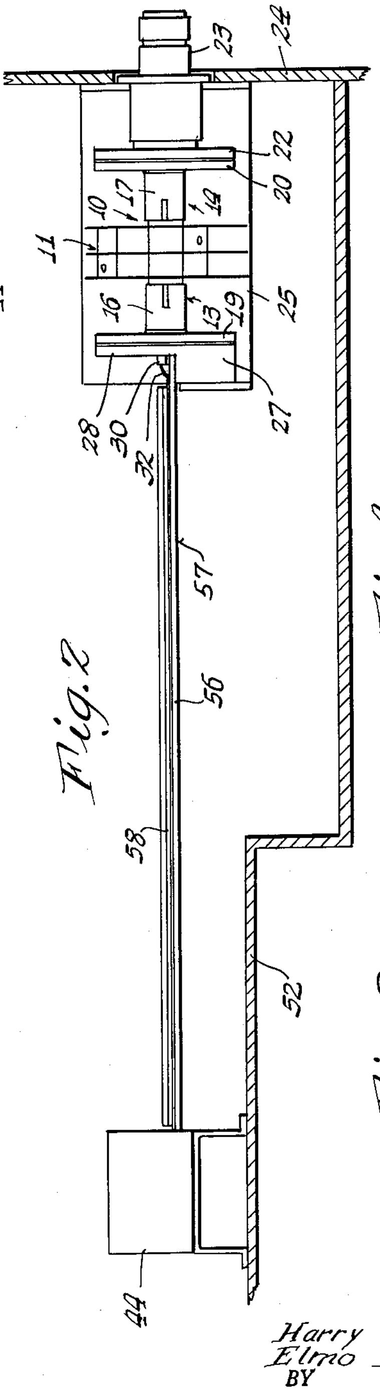
FIG. 2 is a side elevational view of the termination device shown in FIG. 1.

Referring first to FIGS. 1 and 2, there is shown a transmission line termination means in conjunction with a noise diode and accompanying coaxial fittings and hardware. The noise diode is indicated at 10, said diode being of usual construction and having a heat-dissipating fin structrure 11 surrounding it, to dissipate the heat created mainly by the filament or heater of the diode, as will be understood.

The noise diode 10 is carried by coaxial fittings 13 and 14, said fittings having outer tubular conductors 16 and 17 respectively, joined to annular mounting flanges 19 and 20. The mounting flange 20 is secured to a cooperating flange 22 carried by a connector fitting in the form of a jack 23 (commonly referred to as a bulkhead jack) which may be attached in any suitable manner to a front panel 24 as indicated in FIG. 2. The flanges 20 and 22, while mechanically connected together, may be electrically insulated from each other by a suitable insulating washer or disk, as will be readily understood, and may constitute a capacitor effective at high frequencies.

Secured to the connector fitting or jack 23 is a U-shaped mounting bracket 25, said bracket extending rearward from the front panel 24 and its back end mounting a fitting 27 provided with a mounting flange 28 cooperating with the flange 19 of the coaxial fitting 13. The flanges 19 and 28 while mechanically coupled may be electrically insulated from each other by a suitable insulating washer, and may constitute a capacitor as with the case of the flanges 20 and 22.

It will be understood that the noise diode 10 has an outer cylindrical conductor or plate which has a diameter commensurate with that of the conductors 16 and 17 of the coaxial fittings 13 and 14, and has an inner coaxially arranged conductor which is usually hollow and carries within it a power supply lead, there being a filament or heater loop connected with the said inner lead and encircling the inner tubular conductor of the diode, thereby providing an emission device acting as a cathode.

As shown, therefore, the diode 10 has an inner hollow conductor 30 which extends through the mounting flange 28. Through the conductor 30 there extends the filament supply lead 32, for connection to an external circuit arranged to provide the filament current for the diode. Part of the circuit for the filament or heater of the diode is constituted of the inner tubular conductor 30 of the coaxial fitting 13, the said conductor 30 thus constituting one lead of the filament supply which is also common to the high-frequency circuit, said high-frequency circuit including the inner surface of the outer tubular conductors 16 and 17 of the fittings 13 and 14 together with inner surface of the outer tubular conductor or anode of the diode 10.

In accordance with the present invention, in conjunction with the noise diode 10 and the coaxial mounting fittings 13 and 14 therefor, there is provided a novel termination or attenuation means having a power feed circuit, by which an effective and efficient termination of the coaxial system embracing the said fittings and diode is obtained for a very wide range of frequencies without disturbing the symmetry or adversely affecting the high-frequency circuit by virtue of the presence of the power feed lines. In other words, an attenuator is provided for effecting a close impedance match with the coaxial system for a wide range of frequencies while at the same time enabling filament power to be brought to the diode. We have found that it is possible with our present device to obtain a desirably low standing wave ratio having a value of 1.2 to 1. At certain places the standing wave ratio may be as great as 1½ to 1, but such instances are infrequent and represent the maximum which would be had. Moreover, our device dissipates the heat resulting from a high-power, high-frequency source inasmuch as it attenuates the high frequency energy in a uniform manner, without hot spots or concentrations which might have an adverse effect on the operation of the device and on the construction. In addition, the device is constituted of relatively few components of extremely simple construction, which may be easily fabricated and assembled, thereby maintaining the manufacturing cost at a low value. Further, the power feed lines may be constituted to have relatively low resistance and losses, thereby further enhancing the efficiency of the device. As has been mentioned above, the filament power may be D.C. or low frequency A.C. It is common practice to use 60 cycle A.C. and also 400 cycle A.C. for filament power, and herein the term "low frequency" is accordingly intended to designate these frequencies below a value of approximately 500 cycles, which in practice have been found suitable for filament power of electron tubes, as distinguished from high frequencies commonly considered to be in the megacycle ranges.

Accordingly, as shown, the present improved termination device as provided by the invention comprises essentially a combination with a pair of juxtaposed spaced coextensive conductors 36 and 37 having good electrical conductivity and a ground plane conductor 57 in the form of a thin metal sheet of relatively large area, of an elongate, thin and wide, highly electrically resistive strip 39 which is juxtaposed to the conductors 36, 37 and 57 so as to be in the high-frequency field thereof, said resistive strip having a relatively large area in order to facilitate the gradual absorption of the high-frequency energy. The resistive strip 39 is shown as having tapered portions, particularly tapered end portions 41 and 42, with the remainder or intermediate portion of the strip of uniform width. Moreover, the said width of the intermediate portion is seen to be greatly in excess of the combined widths of the power feeders 36 and 37, as clearly shown in FIG. 1.

The resistive strip 39 is not connected in any part of the low frequency circuit but is merely disposed closely adjacent the power feeds 36, 37 and ground sheet or conductor 57 so as to be in the high-frequency field which exists about the said feeders and ground plane conductor.

The ground plane metal sheet 57 may be secured to the under side of a plastic or insulating strip 56 as will be later explained, and electrically connected to the metal flange 28. Further, the resistive strip 39 may, for example, be constituted of a coating of carbon on Bakelite or glass, or it may be formed in various other ways as will be readily understood.

Preferably, as shown in FIG. 1, the power feeders 36, 37 are made to be slightly tapering and may be advantageously constituted of thin strips of metal having good electrical conductivity; the tapered shape, we have found, offers a better impedance match for the high frequency.

The narrow ends of the power feeders 36, 37 are brought into a metal resistor box 44, where the ends of the feeders are connected to a pair of high-frequency choke coils 45 and 46 wound in bifilar fashion about a single coil form, said high-frequency chokes being connected by leads 48 and 49 with a two-circuit connector fitting 50 by which suitable electrical power may be brought to the feeders for the purpose of energizing the diodo heater.

It will be understood that the leads 48, 49 from the chokes are insulated from the resistor box 44, and that the latter may be entirely closed and secured in any suitable manner to a grounded metal chassis 52, as shown in FIG. 2. By virtue of the capacitive coupling of the flanges 28 and 19 the ground side of the high-frequency system includes the metal sheet 57 constituting the ground plane, as will be understood.

High-frequency energy will be prevented from passing to the filament supply fitting 50 by virtue of the high-frequency chokes 45, 46 as will be understood, and in conjunction with such chokes non-inductive resistors 54 to ground are provided, connected between the narrow ends of the power feeders 36, 37 within the resistor box 44, as shown.

By making the power feeds 36, 37 slightly tapered as shown, it is possible to get a more gradual, smoother impedance match than if the feeders were made to have a uniform width throughout their length.

Accordingly, it will be observed that the exposed "hot" side of the high-frequency circuit will be constituted by the power feeders 36, 37, these being exposed as they extend between the resistor box 44 on the left as viewed in FIGS. 1 and 2 and the connector flanges 28 and 19 on the right. The ground side of the high-frequency circuit includes the ground plane sheet or conductor 57. In consequence, a high-frequency field exists about the power feeders 36, 37 and the ground said field plane 57.

We have found that with a transmission line termination or attenuation device as above set forth it is possible to secure a satisfactory matching of impedances throughout a wide range of frequencies, as for example from 10 megacycles to 3,000 megacycles.

From the constructional standpoint, the power feeders 36, 37 and the ground plane sheet 57 may be advantageously carried by an insulating strip 56, as shown.

The resistive strip 39 may be formed in various ways. For example, that at present preferred is to form the resistive strip 39 as a coating of carbon or similar material of low conductivity, said coating being provided on the underside of an insulating sheet or strip 58 of plastic, glass, or other suitable substance. If desired, the resistive strip may be held down, as shown, by a co-extensive strip 60 of plastic material such as Lucite. Carbon coatings providing a resistivity in a coated strip of between 50 ohms and 500 ohms per square (area 1" x 1") are common in the electronic art and would be suitable for the strip 39.

By virtue of the relatively high resistivity of the coating of the resistive strip 39, the said strip may be actually allowed to contact the power feeders 36, 37 without causing appreciable circulating currents, since the low voltage existing between the feeders in conjunction with the high resistivity of the strip results in insignificant leakage and loss. The relative size of the strip 39 as shown in comparison with the conventional connector fitting or jack 23 indicates dimensions of the strip as being slightly less than 1" wide and 6" long.

Figures 3, 4:
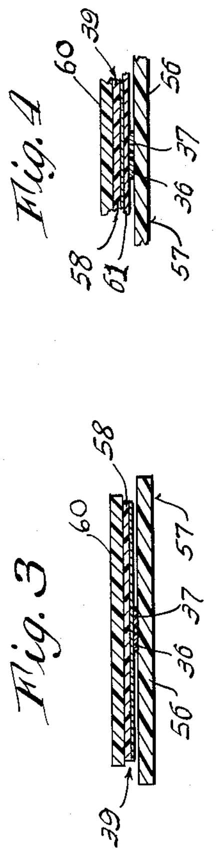
FIG. 3 is a transverse vertical sectional view, taken on the line 3—3 of FIG. 1.
FIG. 4 is a view like FIG. 3, but illustrating a modification of the invention.

In a modified form of the invention illustrated in FIG. 4 an additional insulating strip 61 of "Mylar" or other electrically insulating plastic may be provided, located between the power feeders 36, 37 and the resistive strip 39, and this might be desirable when the conductivity of the resistive strip is required to be in the range where the low voltage across the power feeder 36, 37 would result in appreciable short circuiting currents occurring in the resistive strip.

Instead of "Mylar," the insulating strip 6 when the plastic may be constituted of plastic impregnated paper, polystyrene, Bakelite, etc.

The device of the present invention has utility in connection with the testing of various types of electronic equipment, as for example radio equipment, radar systems and the like. It provides an effective and efficient method for checking such equipment for a noise figure, representing an overall quality factor, which is well understood in the communications and radar art. By virtue of the close matching of the impedances, together with the relatively low standing wave ratio, it is possible to determine the source of noise in equipment and to remedy the same with a great deal of accuracy.

Variations and modifications may be made within the scope of the claims, and portions of the improvements may be used without others.

We claim:

1. A device for terminating a transmission line which has a high-frequency signal circuit and another circuit arranged to carry filament power in the range from direct-current to approximately 500 c.p.s. range, said other circuit including a lead in common with the high-frequency circuit, said device comprising a pair of elongate juxtaposed, spaced, coextensive conductors of good conductivity, said conductors being insulated from each other at one pair of ends and connected respectively with the said other circuit and being adapted to extend in a direction away from the transmission line; an additional elongate conductor juxtaposed to and extending alongside of said spaced conductors and coupled to the portion of the high-frequency circuit which is not common with the said other circuit, and forming with one of said pair of conductors a high frequency field disposed in an elongate area; an elongate, electrically resistive strip having a resistance which is high compared to the said coextensive conductors and which has a resistivity value of between 50 and 500 ohms for a one inch length which is one inch wide, disposed so as not to be electrically connected to the said conductors but juxtaposed to the said conductors so as to be in the high-frequency field thereof, said resistive strip having a relatively large area with respect to said coextensive conductors and which has a size of between 5 and 10 square inches and said strip absorbing the energy of the said high-frequency field; and power supply leads connected to the other pair of ends of the spaced conductors, to apply power thereto.

2. A device for terminating a transmission line which has a high-frequency signal circuit and another circuit arranged to carry filament power in the range from direct-current to approximately 500 c.p.s., said other circuit including a lead in common with the high-frequency circuit, said device comprising a pair of elongate juxtaposed, spaced, coextensive conductors of good conductivity, said conductors being insulated from each other at one pair of ends and connected respectively with the said other circuit and being adapted to extend in a direction away from the transmission line; an additional elongate conductor juxtaposed to said spaced conductors and coupled to the portion of the high-frequency circuit which is not common with the said other circuit, and forming with one of said pair of conductors a high frequency field disposed in an elongate area; an elongate, electrically resistive strip having a resistance which is high compared to the said coextensive conductors and which has a resistivity value of between 50 and 500 ohms for a one inch length which is one inch wide, disposed so as not to be electrically connected to the said conductors but juxtaposed to the said conductors so as to be in the high-frequency field thereof, said resistive strip being tapered at at least one end and having a relatively large area with respect to said coextensive conductors and which has a size of between 5 and 10 square inches and said strip absorbing the energy of the said high-frequency field; and power supply leads connected to the other pair of ends of the spaced conductors, to apply power thereto.

3. A device for terminating a transmission line which has a high-frequency signal circuit and another circuit arranged to carry filament power in the range from direct current to approximately 500 c.p.s., said other circuit including a lead in common with the high-frequency circuit, said device comprising a pair of elongate flat, juxtaposed, spaced, coextensive conductors of good conductivity, disposed in a common plane, said conductors being insulated from each other at one pair of ends and connected respectively with the said other circuit and being adapted to extend in a direction away from the transmission line; an additional elongate conductor juxtaposed to said spaced conductors and coupled to the portion of the high-frequency circuit which is not common with the said other circuit, and forming with one of said pair of conductors a high frequency field disposed in an elongate area; an elongate, highly electrically resistive strip having a resistance which is high compared to the said co-extensive conductors and which has a resistivity value of between 50 and 500 ohms for a one inch length which is one inch wide, disposed so as not to be electrically connected to the said conductors but juxtaposed to the said conductors so as to be in the high-frequency field thereof, said resistive strip having a width greatly in excess of the combined widths of the said flat conductors, having a relatively large area with respect to said coextensive conductors and which has a size of between 5 and 10 square inches, and said strip absorbing the energy of the said high-frequency field; and power supply leads connected to the other pair of ends of the spaced conductors, to apply power thereto.

4. The invention as defined in claim 1 in which the resistive strip is substantially coextensive with the pair of conductors.

5. The invention as defined in claim 1 in which the resistive strip is tapered at both ends.

6. The invention as defined in claim 3 in which the conductors of the said pair are tapered and have their large ends connected to the said other circuit.

7. The invention as defined in claim 1 in which the resistive strip has a poor conductivity with a resistance of between approximately 450 ohms and 6000 ohms and is disposed adjacent the pair of conductors.

8. The invention as defined in claim 1 in which there is an insulating strip disposed between the resistive strip and the pair of conductors.

9. The invention as defined in claim 1 in which there are high-frequency chokes connected in the power supply leads and wound on the same form with each other, said chokes having their turns respectively alongside each other.

10. In combination, a noise diode and a transmission line connected thereto which has a high-frequency signal circuit and another circuit arranged to carry filament power to the said diode in the range from direct current to approximately 500 c.p.s., said other circuit including a lead in common with the high-frequency circuit; and a device for terminating said transmission line, comprising a pair of elongate juxtaposed, spaced, coextensive conductors of good conductivity, said conductors being insulated from each other at one pair of ends and connected respectively with the said other circuit and being adapted to extend in a direction away from the transmission line; an additional elongate conductor juxtaposed to said spaced conductors and coupled to the portion of the high-frequency circuit which is not common with the said other circuit, and forming with one of said pair of conductors a high frequency field disposed in an elongate area; an elongate, electrically resistive strip having a resistance which is high compared to the said coextensive conductors and which has a resistivity value of between 50 and 500 ohms for a one inch length which is one inch wide, disposed so as not to be electrically connected to the said conductors but juxtaposed to the said conductors so as to be in the high-frequency field thereof, said resistive strip having a relatively large area with respect to said coextensive conductors and which has a size of between 5 and 10 square inches and said strip absorbing the energy of the said high-frequency field; and power supply leads connected to the other pair of ends of the conductors, to apply power thereto.

11. The invention as defined in claim 2 in which the transmission line is coaxial, and in which the additional conductor is secured to a connector flange coupled with the outer one of the transmission line conductors.

12. The invention as defined in claim 1, in which the resistive strip comprises a sheet of insulation having a conductive coating applied to it.

13. The invention as defined in claim 1, in which the coextensive conductors comprise, flat tapered strips disposed edgewise to each other, and in which the resistive strip comprises a wide member having a layer of conductive substance, said layer and tapered strips being disposed broadside to each other.

14. The invention as defined in claim 13 in which the layer of conductive substance comprises a coating of carbon.

References Cited in the file of this patent

UNITED STATES PATENTS

| | | |
|---|---|---|
| 2,122,538 | Potter | July 5, 1938 |
| 2,441,165 | Ovrebo | May 11, 1948 |
| 2,637,003 | Johnson et al. | Apr. 28, 1953 |
| 2,740,068 | Robertson et al. | Mar. 20, 1956 |
| 2,895,075 | Millership | July 14, 1959 |
| 2,908,875 | Blatt et al. | Oct. 13, 1959 |